US008963901B2

(12) United States Patent
Chang

(10) Patent No.: US 8,963,901 B2
(45) Date of Patent: Feb. 24, 2015

(54) DISPLAY DEVICE AND METHOD FOR ADJUSTING GRAY-LEVEL OF IMAGE FRAME DEPENDING ON ENVIRONMENT ILLUMINATION

(75) Inventor: Yao-Tsung Chang, New Taipei (TW)

(73) Assignee: Wistron Corp., New Taipei (TW)

( * ) Notice: Subject to any disclaimer, the term of this patent is extended or adjusted under 35 U.S.C. 154(b) by 317 days.

(21) Appl. No.: 13/204,880

(22) Filed: Aug. 8, 2011

(65) Prior Publication Data

US 2012/0268436 A1 Oct. 25, 2012

(30) Foreign Application Priority Data

Apr. 20, 2011 (TW) ............................ 100113770 A

(51) Int. Cl.

| | |
|---|---|
| ***G06F 3/038*** | (2013.01) |
| ***G09G 5/00*** | (2006.01) |
| ***G09G 3/34*** | (2006.01) |
| *G09G 3/36* | (2006.01) |

(52) U.S. Cl.

CPC .................. *G09G 3/34* (2013.01); *G09G 3/344* (2013.01); *G09G 3/3611* (2013.01); *G09G 2320/0626* (2013.01); *G09G 2320/066* (2013.01); *G09G 2360/144* (2013.01)

USPC .......................................................... 345/207

(58) Field of Classification Search

USPC .......................................................... 345/207

See application file for complete search history.

(56) References Cited

U.S. PATENT DOCUMENTS

| | | | | |
|---|---|---|---|---|
| 7,633,558 | B2 | 12/2009 | Tsai et al. | |
| 2005/0093958 | A1* | 5/2005 | Mori et al. | 347/207 |
| 2006/0077214 | A1 | 4/2006 | Tsou et al. | |
| 2007/0229435 | A1* | 10/2007 | Lee | 345/98 |
| 2008/0049005 | A1* | 2/2008 | Okita et al. | 345/207 |
| 2008/0204375 | A1* | 8/2008 | Shin et al. | 345/76 |
| 2008/0284718 | A1* | 11/2008 | Huang et al. | 345/102 |
| 2011/0001737 | A1* | 1/2011 | Kerofsky et al. | 345/207 |
| 2011/0157253 | A1* | 6/2011 | Yamazaki et al. | 345/690 |

FOREIGN PATENT DOCUMENTS

| | | | |
|---|---|---|---|
| CN | 1858840 | A | 11/2006 |
| CN | 101861619 | A | 10/2010 |
| TW | 533399 | | 5/2003 |
| TW | 200612364 | A | 4/2006 |
| TW | I273818 | | 11/2006 |
| TW | M306668 | B | 2/2007 |
| TW | 200729141 | A | 8/2007 |
| TW | M318728 | | 9/2007 |
| TW | 201020606 | | 6/2010 |
| TW | 201032213 | A1 | 9/2010 |
| TW | I336458 | | 1/2011 |

* cited by examiner

*Primary Examiner* — Long D Pham

(74) *Attorney, Agent, or Firm* — Muncy, Geissler, Olds & Lowe, P.C.

(57) ABSTRACT

A display apparatus and method for adjusting the gray level depending on environment illumination is used to adjust the average-gray-level of an image frame with a plurality of pixels. The display device includes a display-panel, an optical-sensor, a controller, and an adjusting module. The display-panel displays the image frame with the plurality of pixels. The optical-sensor is used to obtain the environment illumination. The controller is used to drive the display-panel to display the image frame. The adjusting module is used to adjust gray-levels of the pixels according to the environment illumination. When the environment illumination is too high, the adjusting module raises the gray-level of partial or all pixels; and when the environment illumination is too low, the adjusting module reduces the gray-level of partial or all pixels; so that visual effect of the display device is enhanced.

14 Claims, 12 Drawing Sheets

DISPLAY DEVICE AND METHOD FOR ADJUSTING GRAY-LEVEL OF IMAGE FRAME DEPENDING ON ENVIRONMENT ILLUMINATION

CROSS-REFERENCES TO RELATED APPLICATIONS

This non-provisional application claims priority under 35 U.S.C. §119(a) on Patent Application No. 100113770 filed in Taiwan, R.O.C. on 2011 Apr. 20, the entire contents of which are hereby incorporated by reference.

BACKGROUND OF THE INVENTION

1. Technical Field

This disclosure relates to a display device reflecting ambient light, and in particular, to a display device and a method for adjusting a gray-level of an image frame depending on environment illumination.

2. Related Art

When environment illumination varies, a backlight brightness of a display device with an active backlight module, such as a liquid crystal display device, can be adjusted so that the brightness of image frame suits the environment illumination. In this way, the brightness of the image frame can be adjusted to the most suitable visual state for a user. For example, in ROC Invention Patent No. I336458 and ROC Invention Patent Publication No. TW201020606, technical features for adjusting a brightness of a display depending on environment illumination are proposed.

However, a display device reflecting ambient light, such as an electrophoretic display (e-paper), or a reflective liquid crystal display, reflects the ambient light to make image frame become visible. It is difficult for a display device reflecting ambient light to change the brightness of the external ambient light, and the display device reflecting ambient light can only reflect the ambient light passively.

Further, since the ambient light is reflected by the display device, the brightness of the reflected light is also affected by the displayed image frame. For example, under the illumination of ambient light with high brightness, if the displayed image frame has large blocks of low gray-level pixels, the brightness of the reflected light is high, so that the user feels dazzling when viewing the displayed image frame; similarly, under the irradiation of ambient light with high brightness, if the displayed image frame has large blocks of high gray-level pixels, the brightness of the reflected light generated after the ambient light is reflected is reduced, so that the user feels comfortable when viewing the display image frame.

Conversely, if the environment illumination is low and the display image frame has large blocks of high gray-level pixels, the brightness of the reflected light generated after the display-panel reflects the ambient light is reduced, so that the user cannot view the content of the display image frame clearly. Similarly, when the environment illumination is low, if the display image frame has large blocks of low gray-level pixels, the display-panel can still provide the relatively high brightness of the reflected light, so that the user views the display image frame clearly.

However, the environment illumination is an external factor and cannot be easily adjusted by the user or the display device, so that the visual effect of the display device reflecting the ambient light is easily affected by environment illumination.

SUMMARY

In the related art, the visual effect of the display device reflecting the ambient light is easily affected by the environment illumination, and the environment illumination is the external factor and cannot be controlled by the display device reflecting the ambient light. Embodiments of this disclosure are directed to a display device and a method for adjusting a gray-level of an image frame depending on environment illumination, capable of enhancing the visual effect by adjusting gray-levels of partial or all pixels.

One or more embodiment of this disclosure provides a display device for adjusting a gray-level of an image frame depending on environment illumination. The display device includes a display-panel, an optical-sensor, a controller, and an adjusting module. The display-panel is used to display an image frame with a plurality of pixels. The optical-sensor is used to obtain the environment illumination. The controller is used to drive the display-panel to display the image frame. The adjusting module is used to adjust gray-levels of partial or all pixels in the image frame according to the environment illumination.

A reference illumination range is designated to the adjusting module, and the adjusting module determines whether the environment illumination is within the reference illumination range. When the environment illumination is higher than the reference illumination range, the adjusting module raises the gray-levels of partial or all pixels in the image frame according to the environment illumination, so that the image frame viewed by a user becomes dim. When the environment illumination is lower than the reference illumination range, the adjusting module reduces the gray-levels of partial or all pixels in the image frame, so that the image frame viewed by the user becomes bright.

This disclosure further provides a method for adjusting a gray-level of an image frame depending on environment illumination, which is used to adjust the gray-level of at least one partial image frame in the image frame, in which the partial image frame has a plurality of pixels.

According to this method, firstly the environment illumination is obtained; and the a reference illumination range is set to determine whether the environment illumination is higher than the reference illumination range or is lower than the reference illumination range.

If the environment illumination is higher than the reference illumination range, gray-levels of partial or all pixels in the partial image frame are raised according to the environment illumination, and the adjusted image frame is displayed, so that the image frame viewed by the user becomes dim.

If the environment illumination is lower than the reference illumination range, the gray-levels of partial or all pixels in the partial image frame are reduced according to the environment illumination, and the adjusted image frame is displayed, so that the image frame viewed by the user becomes bright.

In this manner, no matter how the environment illumination varies, when the display-panel displays an image frame the user always experiences the suitable gray-level of the image frame, so as to improve the visual effect for the user.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
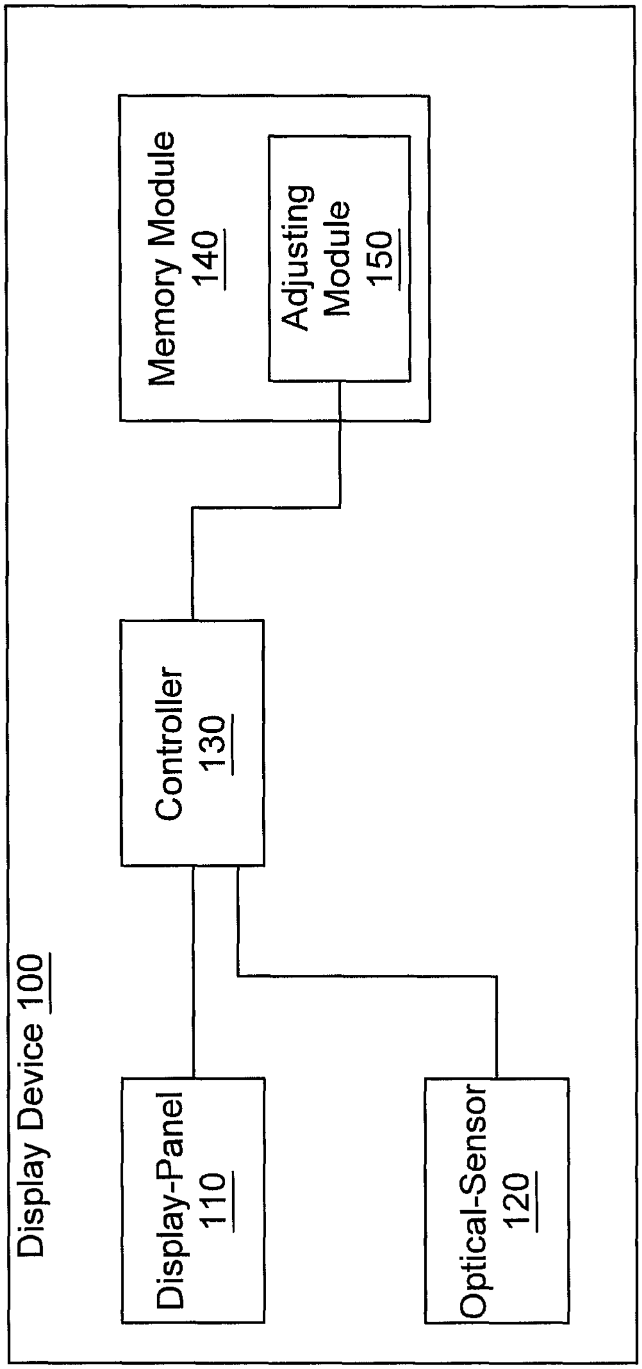
FIG. 1 is a circuit block diagram according to an embodiment.

Please refer to FIG. 1, in which an embodiment of this disclosure provides a display device 100 for adjusting a gray-level of an image frame depending on environment illumination, which executes a method for adjusting a gray-level of an image frame depending on environment illumination. The display device 100 includes a display-panel 110, an optical-sensor 120, a controller 130, a memory module 140, and an adjusting module 150.

As in FIG. 1, the display-panel 110 displays an image frame with a plurality of pixels. The display-panel 110 is a display-panel reflecting the ambient light, and allows a user to view a displayed image frame in a manner of reflecting the ambient light. Examples of the display-panel 110 include, but are not limited to, an electrophoretic display-panel, a reflective liquid crystal display-panel, etc.

As shown in FIG. 1, the optical-sensor 120 is used to detect the ambient light, so as to obtain the environment illumination. The optical-sensor 120 transforms the environment illumination to a brightness value signal, and sends the brightness value signal to the controller 130 or the adjusting module 150, so that the controller 130 or the adjusting module 150 obtains the environment illumination from the optical-sensor 120.

In order to enable the environment illumination obtained by the optical-sensor 120 to approach the environment illumination actually irradiating on the display-panel 110, a preferred position of the optical-sensor 120 is close to the display-panel 110, and the optical-sensor 120 and the display-panel 110 are located on the same side surface of the display device 100; for example, the optical-sensor 120 and the display-panel 110 are disposed on a front bezel of the display device 100.

As shown in FIG. 1, the display-panel 110 and the optical-sensor 120 are electrically connected to the controller 130. The controller 130 receives the environment illumination obtained by the optical-sensor 120, and generates an image frame to drive the display-panel 110 to display the image frame.

As in FIG. 1, the memory module 140 is electrically connected to the controller 130 for storing operating systems, application programs, data, and image files. An example of the memory module 140 is, but not limited to, a flash memory, a magnetic disk, a random access memory, or a combination of the preceding storage devices.

An example of the adjusting module 150 is an independent electronic device electrically connected to the controller 130; an alternative example of the adjusting module 150 is a program code stored in the memory module 140, and loaded and executed by the controller 130.

As shown in FIG. 1, the adjusting module 150 obtains the environment illumination, and adjusts gray-levels of partial or all pixels in an image frame according to the environment illumination, so as to change the brightness of the image frame viewed by the user.

In the present embodiment, the adjusting module 150 achieved by that the controller 130 loads the program code. After the display device 100 is turned on, the controller 130 loads the program code serving as the adjusting module 150 from the memory module 140 and executes the program code, so that the controller 130 additionally has a function of the adjusting module 150.

A gray-level variation range of each pixel forming the image frame is N scales of gray-levels. N is an integer; the 1st scale of gray-level is the lowest gray-level, which provides a white or bright visual effect for the user; and the Nth scale of gray-level is the highest, which provides a visual effect for the user which is either dim or black. Generally, N is 4, 8, 16, or 32, but is not limited to these numbers.

Figure 2:
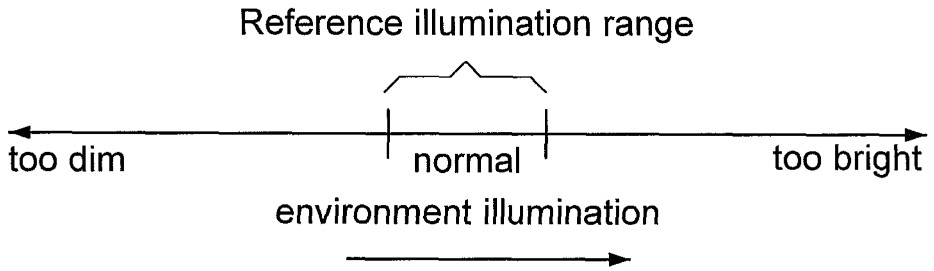
FIG. 2 is a schematic diagram of a reference illumination range according to the embodiment.

As shown in FIG. 2, a reference illumination range is designated to the adjusting module 150, for use as a reference standard to determine whether the environment illumination is normal, too bright, or too dim. When the environment illumination is within the reference illumination range, the environment illumination is determined as normal, and the gray-level of the image frame is not required to be adjusted. When the environment illumination is outside the reference illumination range and is higher than the reference illumination range, the environment illumination is determined as too bright; when the environment illumination is outside the reference illumination range and is lower than the reference illumination range, the environment illumination is determined as too dim. When the environment illumination is too bright or too dim, the gray-level of the image frame has to be adjusted, so as to improve the visual effect for the user.

Figure 3:
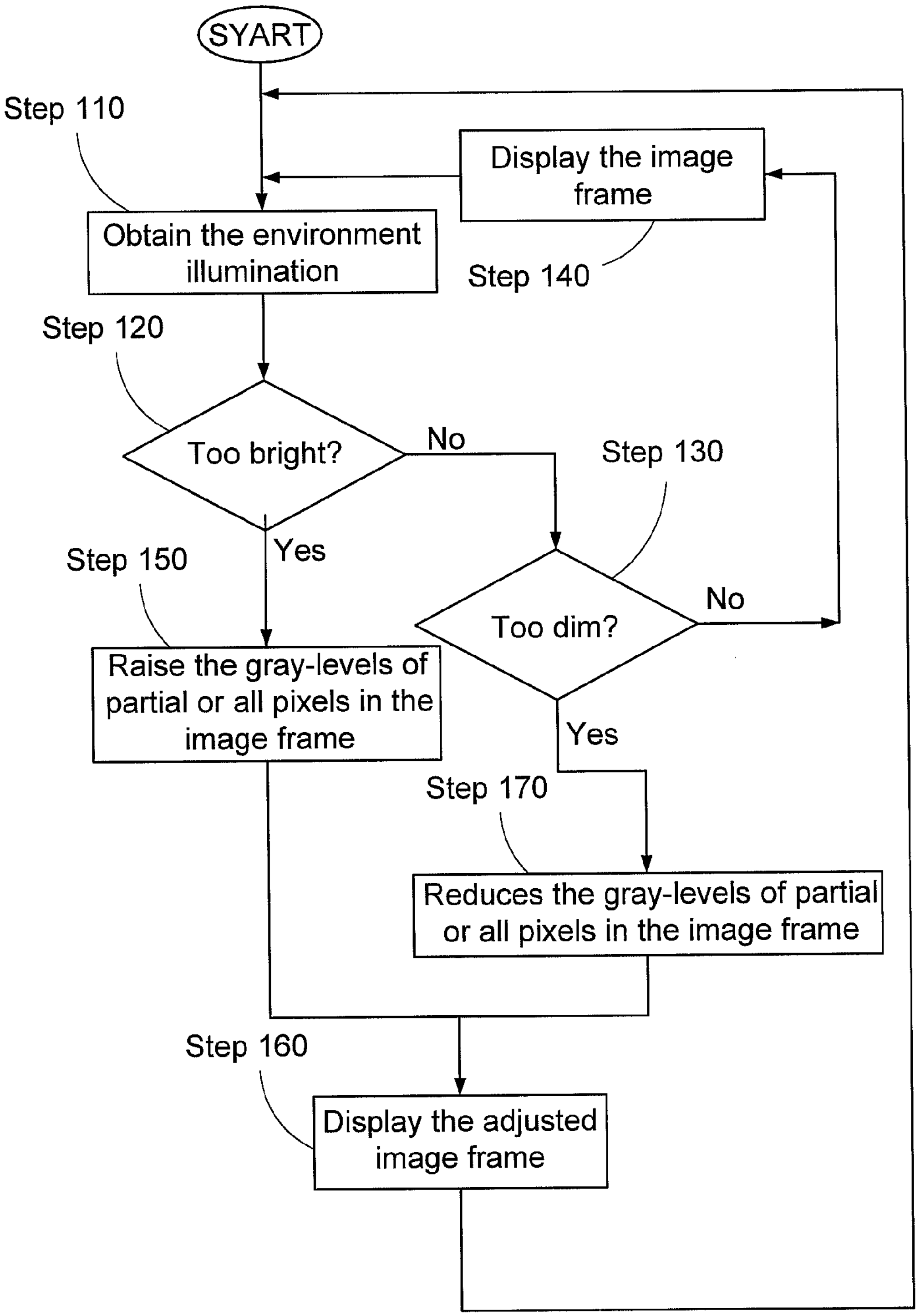
FIG. 3 is a flow chart of a method for adjusting a gray-level of an image frame depending on environment illumination according to the embodiment.

Please refer to FIG. 1 to FIG. 3, in which an embodiment of the present disclosure provides a method for adjusting a gray-level of an image frame depending on environment illumination, which is used to adjust the gray-level of at least one partial image frame in the image frame, in which the partial image frame has a plurality of pixels.

As shown in FIG. 1 and FIG. 3, after the optical-sensor 120 detects the environment illumination, the adjusting module 150 obtains the environment illumination through the optical-sensor 120, as shown in Step 110.

Then, the adjusting module 150 determines whether the obtained environment illumination is within the reference illumination range, so as to determine whether to adjust the gray-level of the image frame.

Determining process are that a reference illumination range is designated to the adjusting module 150, and the adjusting module 150 determines whether the environment illumination is higher than the reference illumination range, so as to determine whether the environment illumination is too bright, as shown in Step 120.

Then, the adjusting module 150 determines whether the environment illumination is lower than the reference illumination range, so as to determine whether the environment illumination is too dim, as shown in Step 130.

The sequence of the preceding Step 120 and Step 130 is not limited to the preceding description; Step 120 and Step 130 are mainly used to determine whether the environment illumination is within the reference illumination range and to determine whether the environment illumination is higher than or lower than the reference illumination range; therefore, the sequence of implementing the two steps is not limited to the preceding description.

If the environment illumination is neither not higher than nor lower than the reference illumination range, the environment illumination is within the reference illumination range. At this time, the adjusting module 150 does not adjust the gray-level of the image frame, and the controller 130 directly drives the display-panel 110 to display the image frame, as shown in Step 140; and the controller 130 returns to Step 110, so as to obtain the environment illumination again.

When the environment illumination is higher than the reference illumination range, the adjusting module 150 determines that the environment illumination is too bright. At this time, the adjusting module 150 raises the gray-levels of partial or all pixels in the image frame according to the environment illumination, as shown in Step 150. The controller 130 drives the display-panel 110 using the adjusted image frame, so as to display the adjusted image frame, as shown in Step 160. As the gray-levels of partial or all pixels in the image frame are raised, the luminance of ambient light reflected by the display-panel is reduced, so that the image frame viewed by the user becomes dim, thereby avoiding the influence of the over-bright image frame on the visual effect.

To adjust the gray-levels of partial pixels or to adjust the all pixels in the image frame is determined to types of display content of the image frame. When the display content of the image frame is text data, since the adjustment of the gray-levels of the pixels has little influence on the reading of the text data, the adjusting module 150 adjusts the gray-levels of all pixels in the image frame according to the environment illumination. When the display content of the image frame is text data and graphs, since the adjustment of the gray-levels of the pixels has a great influence on the graphs, the adjusting module 150 adjusts the gray-levels of partial pixels corresponding to the text data in the image frame, but does not adjust the gray-levels of the pixels of the graphs. In another scenario, the gray-levels of the some adjusted pixels reach an upper limit value or a lower limit value, and cannot be raised or reduced any more, at this time, the adjusting module 150 does not adjust the gray-levels of the pixels, so that the gray-levels of only partial pixels are adjusted by the adjusting module 150.

When the environment illumination is lower than the reference illumination range, the adjusting module 150 determines that the environment illumination is too dim. At this time, the adjusting module 150 reduces the gray-levels of partial or all pixels in the image frame according to the environment illumination, as shown in Step 170. The controller 130 drives the display-panel 110 using the adjusted image frame, so as to display the adjusted image frame, as shown in Step 160. As the gray-levels of partial or all pixels in the image frame are reduced, the luminance of ambient light reflected by the display-panel is raised, so that the image frame viewed by the user becomes bright, thereby avoiding the influence of the overly dim image frame on the visual effect.

In this manner, no matter how the environment illumination varies, when the display-panel 110 displays an image frame the user always experiences the suitable gray-level of the image frame, so as to improve the visual effect for the user.

The preceding adjustment of the gray-level of the image frame is not limited to adjusting the whole image frame. In the preceding steps, the adjustment of the gray-level is performed on the partial image frame; that is to say, whether to adjust the gray-level of each pixel is determined only within the partial image frame. The partial image frame is a part of the image frame, and can also be expanded to the whole image frame.

The details of Step 150 are further described as follows.

Figure 4A:
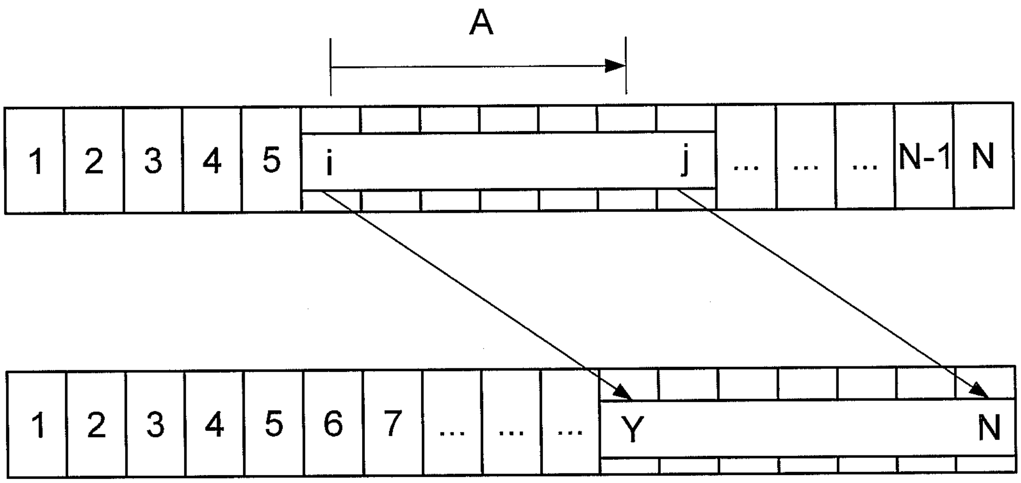
FIG. 4A and FIG. 4B are schematic diagrams of increasing gray-levels of partial or all pixels in an image frame according to the embodiment.
Figure 5:
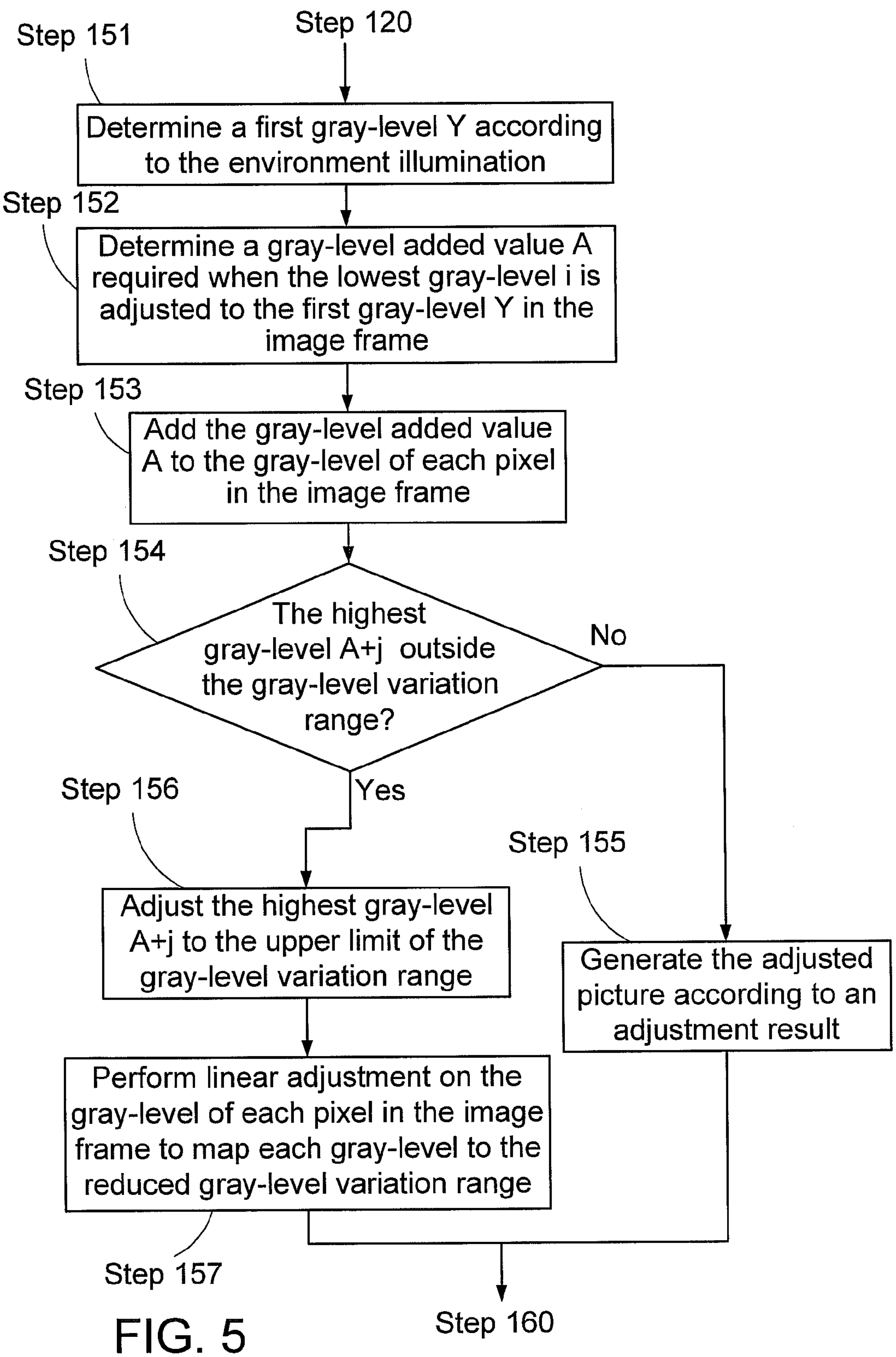
FIG. 5 is a flow chart of increasing gray-levels of partial or all pixels in an image frame according to the embodiment.

Please refer to FIG. 4A and FIG. 5, when the environment illumination is higher than the reference illumination range, the adjusting module 150 raises the gray-levels of partial or all pixels, so as to generate the adjusted image frame.

In order to enable the image frame viewed by the user to become dim, the adjusting module 150 determines a first gray-level Y according to the environment illumination to serve as the lowest gray-level in the adjusted image frame, as shown in Step 151.

Next, the adjusting module 150 determines a gray-level added value A required when the lowest gray-level i is adjusted to the first gray-level Y in the image frame, as shown in Step 152.

Afterwards, the adjusting module 150 adds the gray-level added value A to the gray-level of each pixel in the image frame, as shown in Step 153.

The adjusting module 150 then determines whether the highest gray-level A+j in the adjusted image frame is higher than the Nth scale of gray-level, that is to say, whether the highest gray-level A+j in the adjusted image frame is outside the gray-level variation range of the image frame, as shown in Step 154.

If the adjusted highest gray-level A+j is within the gray-level variation range of the image frame, the gray-level values of all pixels are increased. The adjusting module 150 generates the adjusted image frame according to an adjustment result, as shown in Step 155; the controller 130 then drives the display panel 110 using the adjusted image frame, so as to display the adjusted image frame, as shown in Step 160.

The preceding adjustment result is shown in FIG. 4A, in which an adjustment method is that the gray-level value of each pixel in the image frame is panned, as shown in FIG. 4A, the gray-level value is panned to the right, so that the gray-level value of each pixel is increased.

Figure 4B:
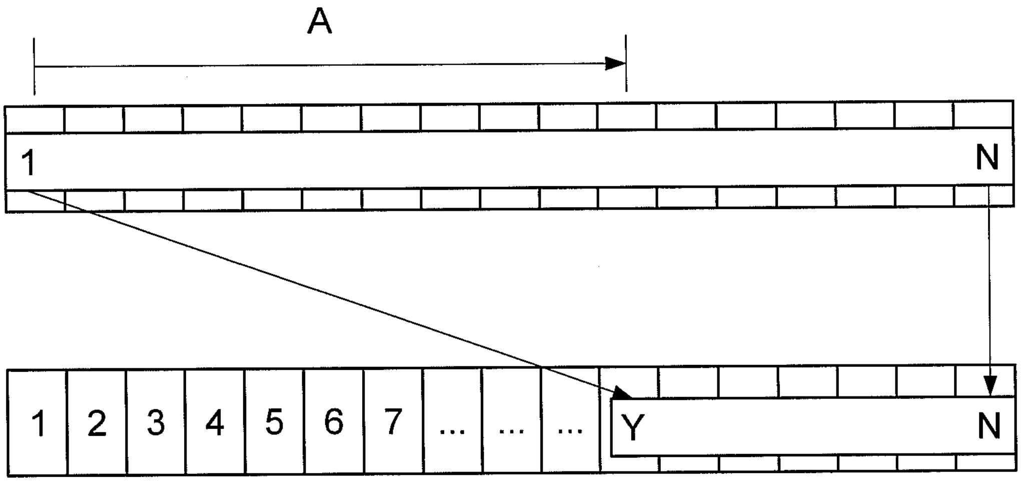

As shown in FIG. 4B and FIG. 5, if the highest gray-level A+j in the adjusted image frame is outside the gray-level variation range of the image frame, the adjusting module 150 adjusts the highest gray-level A+j in the adjusted image frame to the Nth scale of gray-level (the upper limit of the gray-level variation range), so as to reduce the gray-level variation range, as shown in Step 156. The adjusting module 150 performs linear adjustment on the gray-level of each pixel in the image frame, so as to map each gray-level to the reduced gray-level variation range, as shown in Step 157. At this time, only the gray-levels of partial pixels are raised; the pixel with the original gray-level being close to the Nth scale of gray-level are not required to be adjusted. The adjusting module 150 generates the adjusted image frame within the reduced gray-level variation range; and then the controller 130 drives the display-panel 110 using the adjusted image frame, so as to display the adjusted image frame, as shown in Step 160.

The details of Step 170 are further described as follows.

Figure 6A:
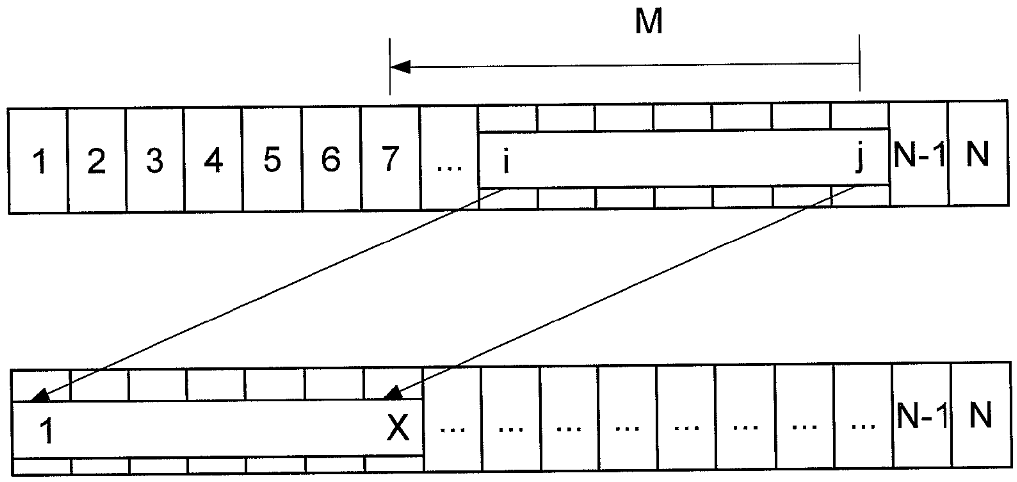
FIG. 6A and FIG. 6B are schematic diagrams of reducing gray-levels of partial or all pixels in an image frame according to the embodiment.
Figure 7:
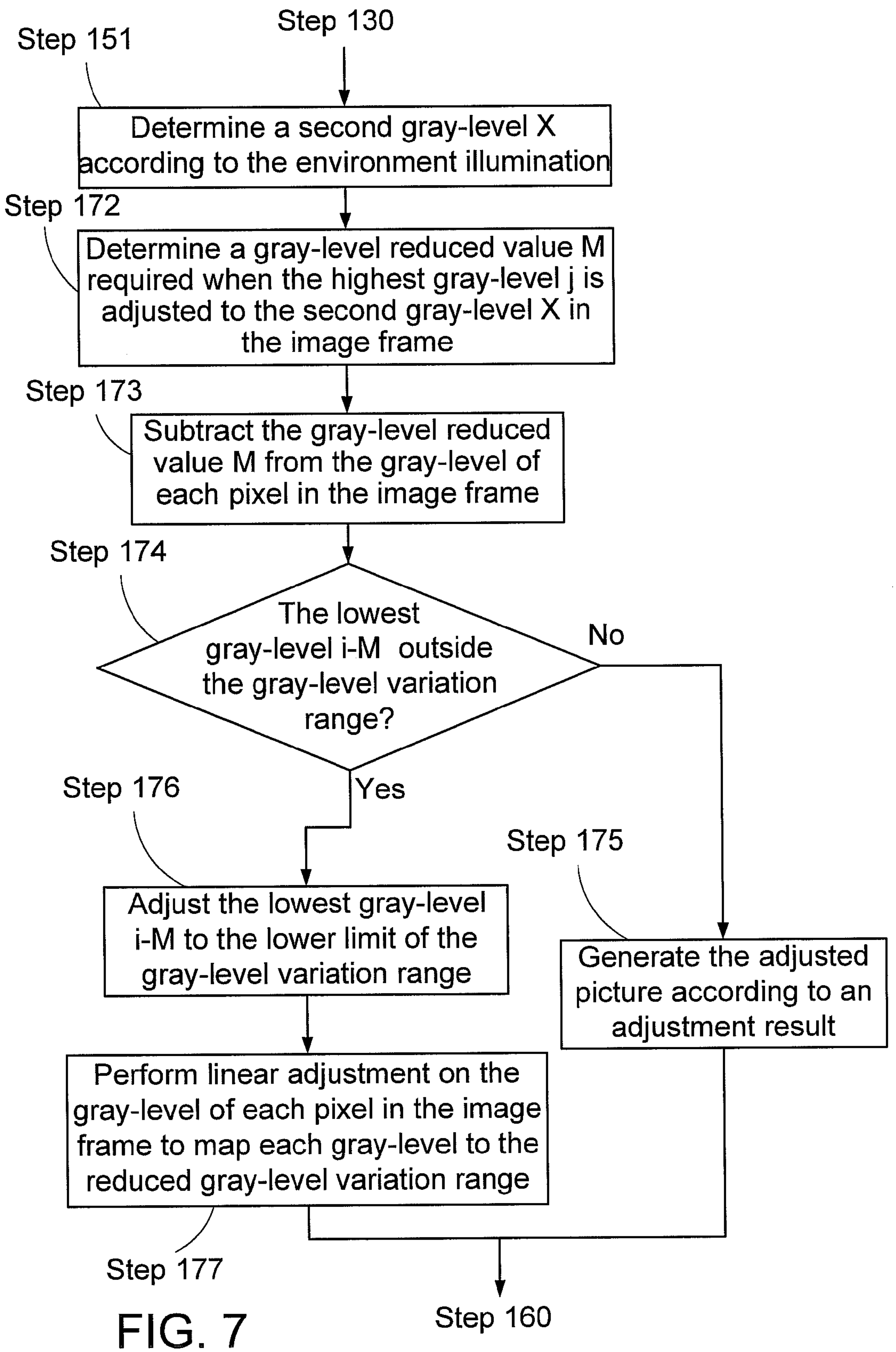
FIG. 7 is a flow chart of reducing gray-levels of partial or all pixels in an image frame according to the embodiment.

Please refer to FIG. 6A and FIG. 7, when the environment illumination is lower than the reference illumination range, the adjusting module 150 reduces the gray-level of each pixel, so as to generate the adjusted image frame.

In order to enable the image frame viewed by the user to become bright, the adjusting module 150 determines a second gray-level X, according to the environment illumination, as the highest gray-level in the adjusted image frame, as shown in Step 171.

Next, the adjusting module 150 determines a gray-level reduced value M required when the highest gray-level j is adjusted to the second gray-level X in the image frame, as shown in Step 172.

Afterwards, the adjusting module 150 subtracts the gray-level reduced value M from the gray-level of each pixel in the image frame, as shown in Step 173.

Then, the adjusting module 150 determines whether the lowest gray-level in the adjusted image frame i−M is lower than the 1st scale of gray-level, that is to say, whether the lowest gray-level in the adjusted image frame i−M is outside the gray-level variation range of the image frame, as shown in Step 174.

If the lowest gray-level in the adjusted image frame i−M is within the gray-level variation range of the image frame, the gray-levels of all pixels are reduced. The adjusting module 150 generates the adjusted image frame according to the adjustment result, as shown in Step 175; the controller 130 then drives the display-panel 110 using the adjusted image frame, so as to display the adjusted image frame, as shown in Step 160.

The adjustment result is shown in FIG. 6A, in which an adjustment method is that the gray-level of each pixel in the image frame is panned, as shown in FIG. 6A, the gray-level is panned to the left, so that the gray-level of each pixel is reduced.

Figure 6B:
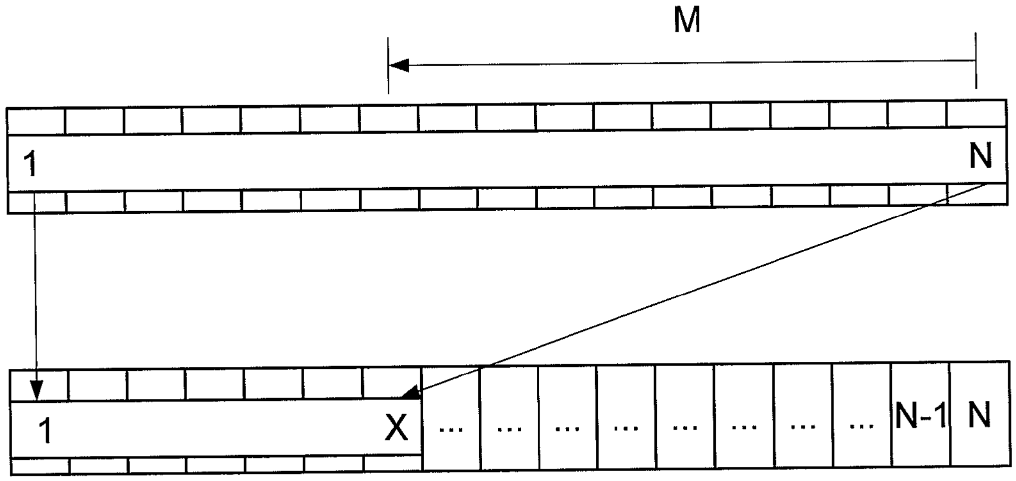

As shown in FIG. 6B and FIG. 7, if the lowest gray-level in the adjusted image frame i-M is outside the gray-level variation range of the image frame, the adjusting module 150 adjusts the lowest gray-level in the adjusted image frame i−M to the 1st scale of gray-level (the lower limit of gray-level variation range), so as to reduce the gray-level variation range, as shown in Step 176. The adjusting module 150 performs linear adjustment on the gray-level of each pixel in the image frame, so as to map each gray-level to the reduced gray-level variation range, as shown in Step 177. At this time, only the gray-levels of partial pixels are reduced, the pixel with the original gray-level being close to the 1st scale of gray-level are not required to be adjusted. The adjusting module 150 generates the adjusted image frame within the reduced gray-level variation range; and then the controller 130 drives the display-panel 110 using the adjusted image frame, the controller 130 then drives the display-panel 110 using the adjusted image frame, so as to display the adjusted image frame, as shown in Step 160.

In addition, when the user feels that an image frame is too dim or too bright, and increasing or reducing the gray-level still cannot enable the user to view the image frame clearly, Step 150 and Step 170 can be modified as follows.

Figure 8:
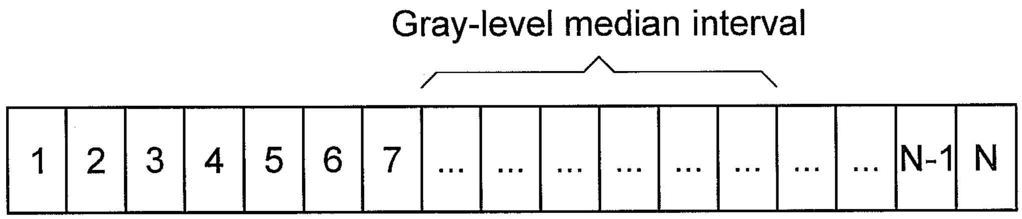
FIG. 8 is a schematic diagram of a gray-level median interval according to the embodiment.

As shown in FIG. 8, a gray-level median interval is further designated to the adjusting module 150. The gray-level median interval is between the 1st scale of gray-level and the Nth scale of gray-level. When an average gray-level of the image frame is lower than the gray-level median interval, the image frame is defined as a white image frame; when the average gray-level of the image frame is higher than the gray-level median interval, the image frame is defined as a black image frame; and when the average gray-level of an image frame is within the gray-level median interval, the image frame is defined as a normal image frame. The gray-level median interval may be a single gray-level or a combination of a plurality of consecutive gray-levels.

Figure 9A:
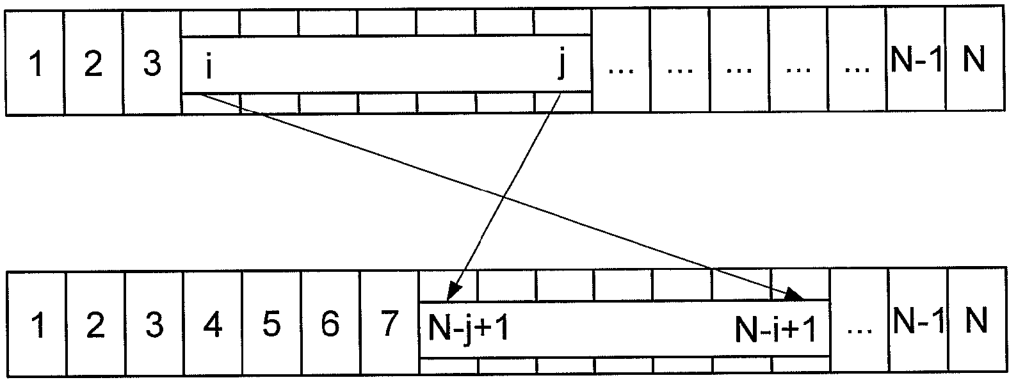
FIG. 9A and FIG. 9B are schematic diagrams of performing an image inverse process on an image frame according to the embodiment.
Figure 10:
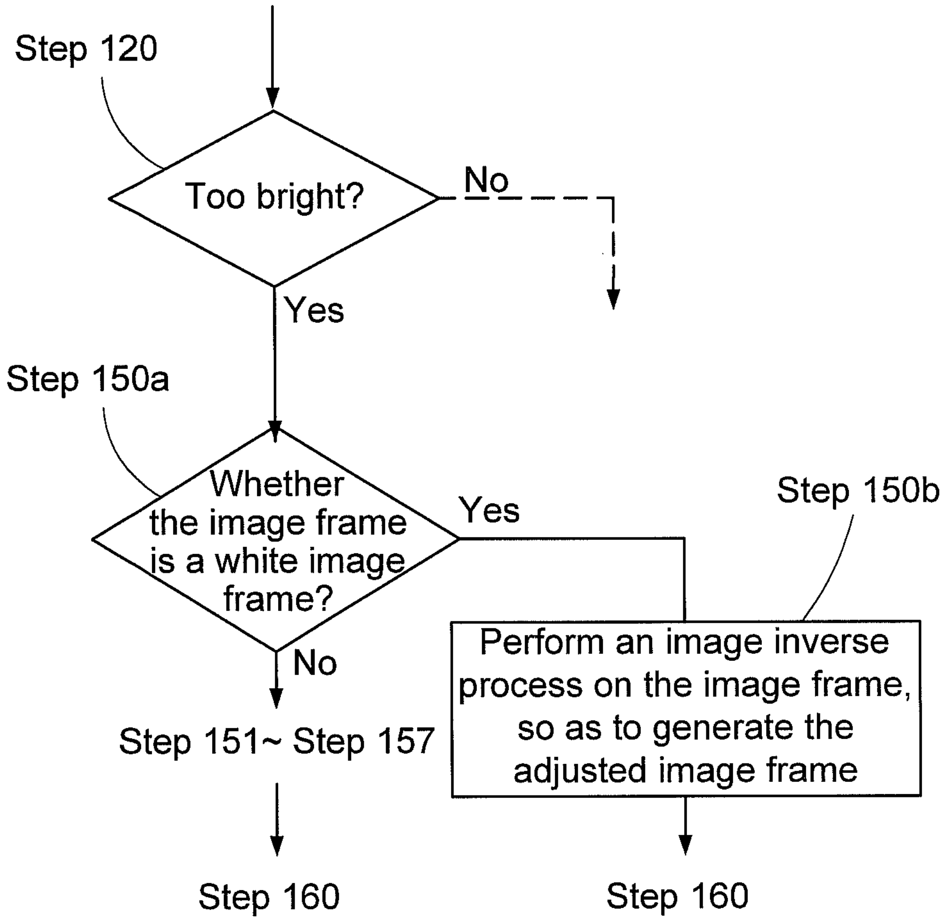
FIG. 10 and FIG. 11 are flow charts of performing an image inverse process on an image frame according to the embodiment.

Please refer to FIG. 9A and FIG. 10, when the environment illumination is higher than the reference illumination range, the adjusting module 150 further determines whether the average gray-level of the image frame is lower than the gray-level median interval (whether the image frame is a white image frame), as shown in Step 150*a*.

If the average gray-level of the image frame is not lower than the gray-level median interval, the adjusting module 150 executes the adjustment process as shown in Step 151 to Step 157.

If the brightness of ambient light is higher than the reference brightness interval, and at the same time, the average gray-level value of the image frame is lower than the gray-level median interval (the image frame is too white), the adjusting module 150 performs an inverse process on the image frame, so as to generate the adjusted image frame, as shown in Step 150*b*.

As shown in FIG. 9A, during the operation of the image inverse process, the adjusting module 150 defines each gray-level value as a complement of N+1, and obtains the adjusted gray-level value, so as to generate the adjusted image frame; for example, the original gray-level values of the pixels are distributed between the ith scale and the jth scale, but after the image inverse process, the ith scale becomes the (N−j+1)th scale and the j scale becomes the (N−i+1)th scale. Then, the controller 130 drives the display panel 110 using the adjusted image frame, so as to display the adjusted image frame, as shown in Step 160.

Figure 9B:
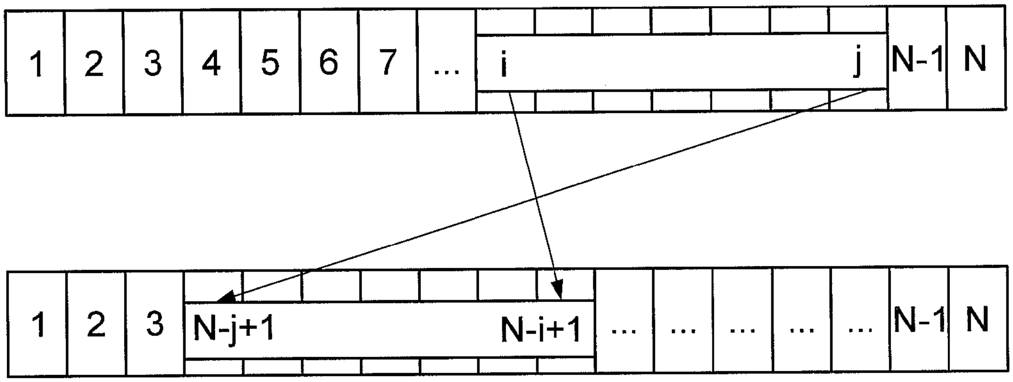
Figure 11:
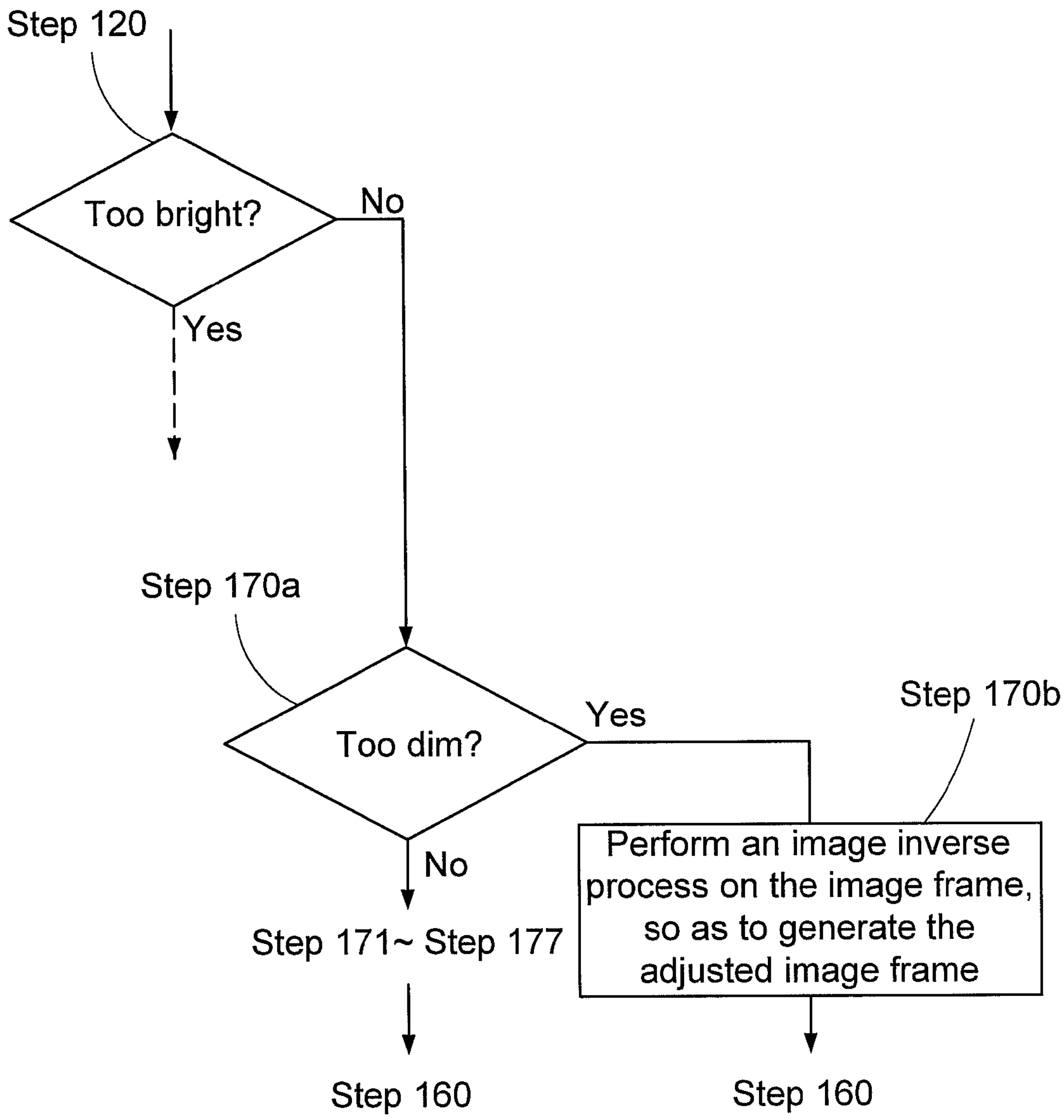

Please refer to FIG. 9B and FIG. 11, when the environment illumination is lower than the reference illumination range, the adjusting module 150 further determines whether the average gray-level of the image frame is higher than the gray-level median interval (the image frame is too black). If the average gray-level of the image frame is not higher than the gray-level median interval, the adjusting module 150 executes the adjustment operation as shown in Step 171 to Step 177.

If the brightness of ambient light is lower than the reference brightness interval, and at the same time the average gray-level value of the image frame is higher than the gray-level median interval (the image frame is too black), the adjusting module 150 performs the image inverse process on the image frame, so as to generate the adjusted image frame, as shown in Step 170*b*. As shown in FIG. 9B, during the operation of the image inverse process the adjusting module 150 defines each gray-level value as the complement of N+1, makes the ith scale become the (N−j+1)th scale and the j scale become the (N−i+1)th scale, and obtains the adjusted gray-level value, so as to generate the adjusted image frame; and then the controller 130 drives the display panel 110 using the adjusted image frame, so as to display the adjusted image frame, as shown in Step 160.

In the embodiments described previously the display device 100 automatically loads the program code and executes the method for adjusting the gray-level of the image frame according to the environment illumination. However, the adjustment of the gray-level of the image frame may be executed manually.

Figure 12:
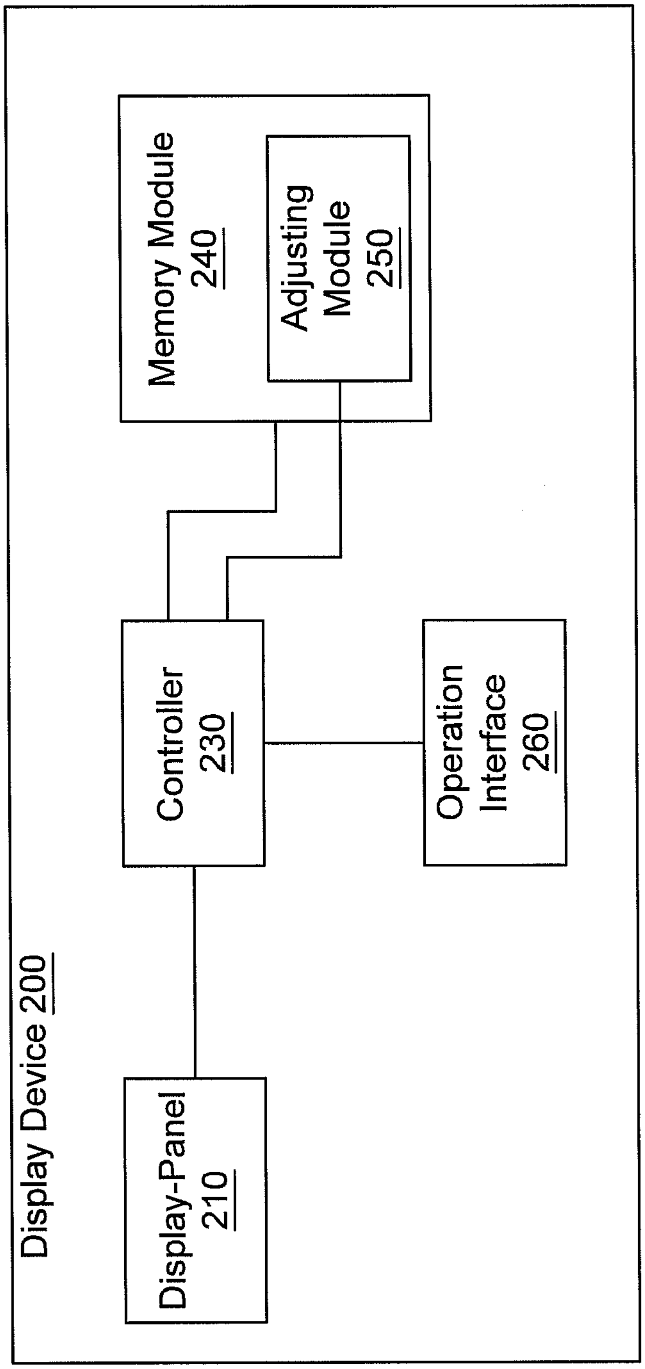
FIG. 12 is a circuit block diagram according to another embodiment.

As shown in FIG. 12, another embodiment of the present disclosure provides a display device 200 for adjusting a gray-level of an image frame depending on environment illumination. The display device 200 includes a display-panel 210, a controller 230, a memory module 240, an adjusting module 250, and an operation interface 260.

The display-panel 210 displays an image frame with a plurality of pixels. The controller 230 is used to drive the display-panel 210 to display the image frame.

The operation interface 260 is operated by a user to send an image frame brightening command, an image frame dimming command, or an image inverse command to the controller 230.

After receiving the image frame brightening command, the controller 230 starts the adjusting module 250 to reduce gray-levels of partial or all pixels, so as to generate the adjusted image frame. The controller 230 drives the display-panel 210 using the adjusted image frame, so as to display the adjusted image frame.

After receiving the image frame dimming command, the controller 230 starts the adjusting module 250, to raise the gray-levels of partial or all pixels, so as to generate the adjusted image frame. The controller 230 drives the display-panel 210 using the adjusted image frame, so as to display the adjusted image frame.

After receiving the image inverse command, the controller 230 starts the adjusting module 250 to perform an image inverse process on the image frame, so as to generate the adjusted image frame. The controller 230 drives the display-panel 210 by the adjusted image frame, so as to display the adjusted image frame.

In addition, in the embodiments described previously the adjustment of the gray-level may be performed on the whole image frame or on the partial image frame. For example, in an image frame with both text data and graphs, the controller 130 first marks the partial image frame with the text data, and the adjusting module 150 then performs the adjustment of the gray-level on the partial image frame, but adjusting module 150 does not perform the adjustment of the gray-level on other parts of the image frame including the graphs.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A display device for adjusting a gray-level of a image frame depending on environment illumination, comprising:

a reflecting ambient light display-panel, for displaying an image frame with a plurality of pixels, and each pixel of the reflecting ambient light display-panel reflects an ambient light according to a gray-level thereof;

an optical-sensor, for obtaining the environment illumination, wherein the optical-sensor and the reflecting ambient light display-panel are located on the same side surface of the display device;

a controller, for driving the display-panel to display the image frame; and an adjusting module, for adjusting gray-levels of at least partial pixels in the image frame according to the environment illumination; wherein a reference illumination range is designated to the adjusting module, and the adjusting module determines whether the obtained environment illumination is within the reference illumination range;

wherein when the environment illumination is higher than the reference illumination range, the adjusting module raises the gray-levels of at least partial pixels in the image frame according to the environment illumination;

wherein when the environment illumination is lower than the reference illumination range, the adjusting module reduces the gray-levels of at least partial pixels in the image frame according to the environment illumination; and wherein a gray-level median interval is further designated to the adjusting module; when the environment illumination is higher than the reference illumination range and an average gray-level of the image frame is lower than or higher than the gray-level median interval, the adjusting module performs an image inverse process on the image frame.

2. The display device as claimed in claim 1, wherein the adjusting module is an independent electronic component, electrically connected to the controller.

3. The display device as claimed in claim 1, further comprising a memory module, electrically connected to the controller, wherein the adjusting module is a program code, stored in the memory module, and loaded and executed by the controller.

4. The display device as claimed in claim 1, wherein the adjusting module is an independent electronic component, electrically connected to the controller.

5. The display device as claimed in claim 1, wherein when the environment illumination is lower than the reference illumination range and an average gray-level of the image frame is higher than the gray-level median interval, the adjusting module performs the image inverse process on the image frame.

6. The display device as claimed in claim 1, wherein the controller marks the partial image frame with the text data before the adjustment of the gray-level is performed on the image frame, and the adjusting module then performs the adjustment of gray-level on the partial image frame.

7. A method for adjusting a gray-level of a image frame depending on environment illumination, for adjusting the gray-level of at least partial image frame in the image frame, wherein the partial image frame comprises a plurality of pixels and each pixel reflects an ambient light according to the gray-level thereof, the method comprising the steps of:

obtaining the environment illumination;

designating a reference illumination range;

determining whether the environment illumination is higher than or lower than the reference illumination range; and if the environment illumination is higher than the reference illumination range, raising gray-levels of at least partial pixels in the partial image frame according to the environment illumination, and displaying the adjusted image frame;

if the environment illumination is lower than the reference illumination range, reducing gray-levels of the at least partial pixels in the partial image frame according to the environment illumination, and displaying the adjusted image frame;

if the environment illumination is neither not higher than or lower than the reference illumination range, obtaining the environment illumination again instead of adjusting the gray-level of the image frame;

wherein raising the gray-levels of the at least partial pixels in the partial image frame comprises:

determining a first gray-level according to the environment illumination;

determining a gray-level added value required when the lowest gray-level is adjusted to the first gray-level in the partial image frame;

adding the gray-level added value to the gray-level of each pixel in the partial image frame;

determining whether the highest gray-level in the adjusted image frame is higher than an upper limit of a gray-level variation range of the image frame; if the highest gray-level in the adjusted image frame is not higher than the gray-level variation range of the image frame, generating the adjusted image frame according to an adjustment result; and if the highest gray-level in the adjusted image frame is higher than the upper limit of the gray-level variation range of the image frame, adjusting the highest gray-level to the upper limit of the gray-level variation range, so as to reduce the gray-level variation range; performing linear adjustment on the gray-level of each pixel in the image frame, so as to map each gray-level to the reduced gray-level variation range; and obtaining the adjusted gray-level of each pixel, so as to generate the adjusted image frame.

8. The method as claimed in claim 7, wherein before determining the first gray-level according to the environment illumination, the method comprises:

determining whether an average gray-level of the partial image frame is lower than a gray-level median interval; if the average gray-level of the partial image frame is lower than the gray-level median interval, performing an image inverse process on the partial image frame, so as to generate the adjusted image frame.

9. The method as claimed in claim 7, wherein reducing the average gray-level of the image frame comprises:

determining a second gray-level according to the environment illumination;

determining a gray-level reduced value required when the highest gray-level is adjusted to the second gray-level in the partial image frame;

subtracting the gray-level reduced value to the gray-level of each pixel in the partial image frame;

determining whether the lowest gray-level in the adjusted image frame is lower than a lower limit of a gray-level variation range of the image frame; if the lowest gray-level in the adjusted image frame is not lower than the gray-level variation range of the image frame, generating the adjusted image frame according to an adjustment result; and if the lowest gray-level in the adjusted image frame is lower than the lower limit of the gray-level variation range of the image frame, adjusting the lowest gray-level in the adjusted image frame to the lower limit of the gray-level variation range to reduce the gray-level variation range; performing linear adjustment on the gray-level of each pixel in the image frame, so as to map each gray-level to the reduced gray-level variation range; and obtaining the adjusted gray-level of each pixel, so as to generate the adjusted image frame.

10. The method as claimed in claim 9, wherein before determining the second gray-level according to the environment illumination, the method further comprises:

determining whether the average gray-level of the partial image frame is higher than a gray-level median interval; if the average gray-level of the partial image frame is higher than the gray-level median interval, performing an image inverse process on the partial image frame, so as to generate the adjusted image frame.

11. The method as claimed in claim 7, wherein when the display content of the image frame is text data, adjusting the gray-levels of all pixels in the image frame according to the environment illumination.

12. The method as claimed in claim 7, wherein when the display content of the image frame is text data and graphs, adjusting the gray-levels of partial pixels corresponding to the text data in the image frame.

13. A display device for adjusting a gray-level of a image frame depending on environment illumination, comprising:

a reflecting ambient light display-panel, for displaying an image frame with a plurality of pixels, and each pixel of the reflecting ambient light display-panel reflects an ambient light according to a gray-level thereof;

an optical-sensor, for obtaining the environment illumination;

a controller, for driving the display-panel to display the image frame; and an adjusting module, for adjusting gray-levels of at least partial pixels in the image frame according to the environment illumination; wherein a reference illumination range is designated to the adjusting module, and the adjusting module determines whether the obtained environment illumination is within the reference illumination range;

wherein when the environment illumination is higher than the reference illumination range, the adjusting module raises the gray-levels of at least partial pixels in the image frame according to the environment illumination, so that the brightness of a reflected light generated after the ambient light is reflected is reduced;

wherein when the environment illumination is lower than the reference illumination range, the adjusting module reduces the gray-levels of at least partial pixels in the image frame according to the environment illumination, so that the brightness of the reflected light is high; and wherein a gray-level median interval is further designated to the adjusting module; when the environment illumination is lower than the reference illumination range and an average gray-level of the image frame is higher than the gray-level median interval, the adjusting module performs an image inverse process on the image frame.

14. A method for adjusting a gray-level of a image frame depending on environment illumination, for adjusting the gray-level of at least partial image frame in the image frame, wherein the partial image frame comprises a plurality of pixels and each pixel reflects an ambient light according to the gray-level thereof, the method comprising the steps of:

obtaining the environment illumination;

designating a reference illumination range;

determining whether the environment illumination is higher than or lower than the reference illumination range; and if the environment illumination is higher than the reference illumination range, raising gray-levels of at least partial pixels in the partial image frame according to the environment illumination so that the brightness of a reflected light generated after the ambient light is reflected is reduced, and displaying the adjusted image frame;

if the environment illumination is lower than the reference illumination range, reducing gray-levels of the at least partial pixels in the partial image frame according to the environment illumination so that the brightness of the reflected light is high, and displaying the adjusted image frame;

if the environment illumination is neither not higher than or lower than the reference illumination range, obtaining the environment illumination again instead of adjusting the gray-level of the image frame;

wherein reducing the average gray-level of the image frame comprises:

determining a second gray-level according to the environment illumination;

determining a gray-level reduced value required when the highest gray-level is adjusted to the second gray-level in the partial image frame;

subtracting the gray-level reduced value to the gray-level of each pixel in the partial image frame;

determining whether the lowest gray-level in the adjusted image frame is lower than a lower limit of a gray-level variation range of the image frame; if the lowest gray-level in the adjusted image frame is not lower than the gray-level variation range of the image frame, generating the adjusted image frame according to an adjustment result; and if the lowest gray-level in the adjusted image frame is lower than the lower limit of the gray-level variation range of the image frame, adjusting the lowest gray-level in the adjusted image frame to the lower limit of the gray-level variation range to reduce the gray-level variation range; performing linear adjustment on the gray-level of each pixel in the image frame, so as to map each gray-level to the reduced gray-level variation range; and obtaining the adjusted gray-level of each pixel, so as to generate the adjusted image frame.

* * * * *